(12) United States Patent
Sugimoto et al.

(10) Patent No.: US 11,825,527 B2
(45) Date of Patent: Nov. 21, 2023

(54) SYSTEMS AND METHODS FOR SELECTING A NETWORK INTERFACE BASED ON A MOTION STATE OF A VEHICLE

(71) Applicant: Toyota Motor North America, Inc., Plano, TX (US)

(72) Inventors: Shingo Sugimoto, Frisco, TX (US); Walter Accessor, Little Elm, TX (US)

(73) Assignee: Toyota Motor North America, Inc., Plano, TX (US)

( * ) Notice: Subject to any disclaimer, the term of this patent is extended or adjusted under 35 U.S.C. 154(b) by 301 days.

(21) Appl. No.: 17/219,005

(22) Filed: Mar. 31, 2021

(65) Prior Publication Data

US 2022/0322461 A1 Oct. 6, 2022

(51) Int. Cl.
*H04W 76/10* (2018.01)
*H04W 84/18* (2009.01)
*G01V 11/00* (2006.01)
*G01P 15/00* (2006.01)
*G01P 3/00* (2006.01)

(52) U.S. Cl.
CPC ............... *H04W 76/10* (2018.02); *G01P 3/00* (2013.01); *G01P 15/00* (2013.01); *G01V 11/00* (2013.01); *H04W 84/18* (2013.01)

(58) Field of Classification Search
CPC ..... H04W 76/10; H04W 84/18; H04W 48/18; H04W 4/40; G01P 3/00; G01P 15/00; G01V 11/00
See application file for complete search history.

(56) References Cited

U.S. PATENT DOCUMENTS

| 9,160,629 B1 | 10/2015 | Martin et al. |
| 9,439,121 B2 | 9/2016 | Barreto De Miranda Sargento et al. |
| 10,249,193 B2 | 4/2019 | Altintas et al. |
| 2014/0244104 A1* | 8/2014 | Tan .................... H04B 1/3822 701/36 |
| 2017/0150490 A1 | 5/2017 | Chen et al. |

FOREIGN PATENT DOCUMENTS

DE   102014200560 A1   7/2015

OTHER PUBLICATIONS

W. Steven Conner, et al. 'Overview of the Amendment for Wireless Local Area Mesh Networking'. Nov. 13, 2006.
Hidenori Aoki, et al. IEEE 802.11s Wireless LAN Mesh Network Technology. NTT DoComo Technical Journal vol. 8 No. 2. Feb. 25, 2009.

* cited by examiner

*Primary Examiner* — Jae Y Lee
(74) *Attorney, Agent, or Firm* — Dinsmore & Shohl LLP (57) ABSTRACT

A mesh network system includes an electronic control unit. The electronic control unit selects determines a current motion state of a vehicle of a mesh network. The electronic control unit may calculates radio metric scores for network interfaces. The radio metric scores are weighted based on the current motion. The electronic control unit selects a desired network interface for communications between the vehicles based on the radio metric scores.

19 Claims, 4 Drawing Sheets

SYSTEMS AND METHODS FOR SELECTING A NETWORK INTERFACE BASED ON A MOTION STATE OF A VEHICLE

TECHNICAL FIELD

The present specification generally relates to mesh networks between vehicles and, more specifically, the present disclosure provides systems and methods for selection of a network interface device for communications between nodes of a mesh network based on a motion state of a vehicle.

BACKGROUND

Communication functionality between vehicles, the internet, and other data sources is an ever-increasing requirement for vehicles. Communication functionality enables a vehicle to share information, such as sensor information, receive and transmit system updates, navigation information, and the like. For example, when a vehicle requires an update, a vehicle connects to the internet and receives the update from an internet based data source, such as a server. Additionally, vehicles may be configured to establish peer-to-peer networks, generally referred to as vehicle-to-vehicle communication (V2V). These networks may be established based on proximity of vehicles to each other and/or strength of signal. However, the network connections may be transient as vehicles change speed, direction of travel or the like. Without the ability to establish less transient network connections, the effectiveness of operations, such as edge computing between vehicles or sharing updates, which can consist of large files, may not be fully utilized since the connections may periodically change.

Accordingly, there is a need for mesh networks that are more efficient, reliable, or are otherwise improved.

SUMMARY

In one embodiment, a mesh network system includes an electronic control unit. The electronic control unit is configured to determine a current motion state of a plurality of vehicles of a mesh network. The electronic control unit may be further configured to calculate radio metric scores for each of a plurality of network interfaces. The radio metric scores are weighted based on the current motion state such that a first radio metric score of a first network interface is more heavily weighted when in the current motion state. The electronic control unit may be configured to select a desired network interface from the plurality of network interfaces for communications between the plurality of vehicles based on the radio metric scores.

In another embodiment, a mesh network system includes a computing device operatively in communication with a plurality of vehicles of a mesh network. The computing device is configured to determine a current motion state of the plurality of vehicles. The computing device is further configured to calculate weighting factors "O" for a plurality of network interfaces based at least in part on the current motion state. The computing device is further configured to calculate radio metric scores "C" for each of the plurality of network interfaces as a function of at least the weighting factors "O". The computing device is further configured to select a desired network interface from the plurality of network interfaces for communications between the plurality of vehicles based on the radio metric scores.

In another embodiment, a method is described. The method includes determining, by a computing device, a current motion state of a plurality of vehicles of a mesh network. The method may further include calculating weighting factors for each of a plurality of network interfaces based at least in part on the current motion state. The method may further include selecting a desired network interface from the plurality of network interfaces for communications between the plurality of vehicles based on the radio metric scores.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

The embodiments disclosed herein relate to systems and methods for selecting a network interface for communication between vehicular nodes of a mesh network. The mesh networks may facilitate information sharing, edge computing, access to wide area networks, and the like among the vehicles of the mesh network. Embodiments described herein are directed to systems and methods that may bias a radio metric towards selecting a wireless network interface based on a vehicle motion state, environmental factors, or the like. In an example, when a vehicle has a motion state that is stationary, below a threshold speed (e.g., such as in high traffic), or the like, a radio metric value may be biased toward selecting Wi-Fi network interface for routing communication within the mesh network. When the vehicle has a motion state that is not stationary and/or at or above a threshold speed, the radio metric value may be unbiased against any particular network or may be biased towards a different network (e.g., Long-Term Evolution (LTE), $x^{th}$ generation cellular technology (e.g., 2G, 3G, 4G, 5G, etc.), dedicated short-range communication network (DSRC), vehicle to everything (V2X), cellular V2X C-V2X or the like) than that of in a motion state that is stationary (e.g., Wi-Fi), below a threshold speed (e.g., such as in high traffic), or the like.

In some traditional systems, mesh networks may employ IEEE 802.11 routing protocols which biases communications towards a Wi-Fi network interface as the interface for use in a mesh network. Wi-Fi network interfaces may not always be the most reliable or desired network interface for the communications within the mesh network, due in part to movement of nodes, changes in speeds, location, distance to another node, interference, or the like. Accordingly, embodiments may resolve or improve network interface selection through a network interface selection component that may select a target network interfaces from available network interfaces, wherein the network interface selection component selects a desired network interface based on a radio metric that equally weights network interfaces such that selection does not bias towards a Wi-Fi network interface.

Figure 1:
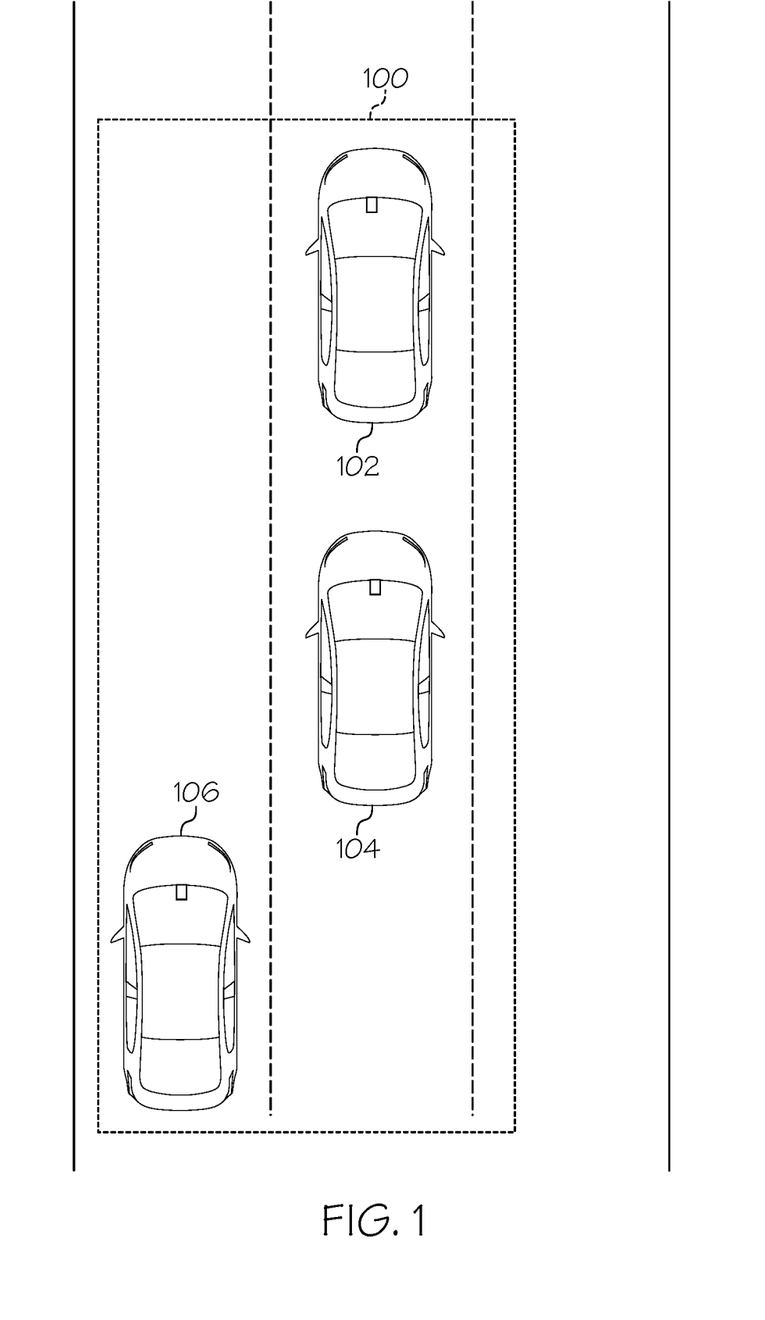
FIG. 1 depicts an illustrative embodiment of a mesh network system including vehicles and a mesh network according to one or more embodiments shown and described herein.

Turning now to the drawings wherein like numbers refer to like structures, and particularly to FIG. 1, an illustrative embodiment of a mesh network system 100 including nodes that comprise vehicles, such as a first vehicle 102, a second vehicle 104, and a third vehicle 106 traveling in the same direction along a roadway. In embodiments, a plurality of vehicles that are determined to be traveling with similar speeds, headings, proximities, destinations, or the like may be identified and grouped together via their communications units in a mesh network system 100. A communications unit (e.g., communications unit 170 of FIG. 2) may comprise one or more network interface devices, telematics units, or the like. For instance, a communications unit may include network interfaces for communicating via different access protocols, different duplexing schemes, in disparate frequency bands, etc. Such network interfaces may include Wi-Fi, $x^{th}$ generation cellular technology (e.g., 2G, 3G, 4G, 5G, etc.), WCDMA, LTE, LTE Advanced, ZigBee, Bluetooth, WiMAX, UMTS, code-division multiple access (CDMA), C-V2X, Global System for Mobile Communications (GSM), or the like.

It is noted that the first vehicle 102, the second vehicle 104, and the third vehicle 106 may be traveling in an appropriate configuration, such as a line formation, or other formation wherein the first vehicle 102, the second vehicle 104, and the third vehicle 106 are generally within a determined distance from each other. In some embodiments, the vehicles of a mesh network system 100 may be separated by other vehicles on the road or may be a defined distance apart, but still traveling with similar speeds, headings, proximities, destinations, and/or the like. It is further noted that different numbers and types of vehicles may be utilized by or be comprised by the mesh network system 100.

The first vehicle 102, the second vehicle 104, and the third vehicle 106 may be communicatively linked to form the mesh network system 100. The mesh network system 100 may include a routing table that includes a vehicle identification (e.g., communications unit identification numbers, IP address, or other information related to the first vehicle 102, the second vehicle 104, and the third vehicle 106). A computing device (e.g., electronic control unit, etc.) of one or more of the first vehicle 102, the second vehicle 104, and the third vehicle 106, or a remote computing device may store the routing table in its memory (e.g., non-transitory computer-readable memory). Furthermore, the computing device may further determine member vehicles to be included in a mesh network system 100 based on their distance from each other, destination, speed, traveling path, or the like. These parameters may be dependent on speed and heading information or independent therefrom.

The mesh network system 100 may operate in an edge-computing environment where tasks such as navigation, autonomous environment detection and analysis, and the like may be performed by the electronic control units of the first vehicle 102, the second vehicle 104, and the third vehicle 106 that have available resources. For example, the first vehicle 102 may have an electronic control unit with advanced computing power over the second vehicle 104 and the third vehicle 106, so that the first vehicle 102 may be tasked with operations that require advanced computing resources. The second vehicle 104 may include sensor packages that are superior or positioned better with respect to their traveling relationships. Therefore, those sensor packages may be utilized over those of the first vehicle 102 and the third vehicle 106 in the mesh network system 100. As another example, the third vehicle 106 may have data or system updates that first vehicle 102 and the second vehicle 104 in the mesh network system 100 require. Therefore, instead of each of the first vehicle 102, the second vehicle 104, and the third vehicle 106 establishing a cellular connection and performing tasks independently, which may be slow and costly, the first vehicle 102, the second vehicle 104, and the third vehicle 106 in the mesh network system 100, through a network interface such as WiFi, may transmit and receive data with each other. This may reduce download times and improve the distribution of a system update as vehicles may operate as additional sources of the update as opposed to a central server connected via a wide area network.

In embodiments described herein, a vehicle of the mesh network system 100 may be identified as a master node vehicle by a computing device of a vehicle or a remote computing device. This master node vehicle may receive the designation of master node vehicle based on capabilities of the vehicle, such as processing or computing resources, advanced telematics systems, or the like. This vehicle may also receive this designation based on information that it may have that other vehicles require. A master node vehicle may operate as an access point for other vehicles to connect through to access a wide area network (WAN), such as the internet. For example, some vehicles may only be equipped with near field communication interfaces such as Bluetooth or WiFi. These vehicles may be able to access WAN destinations by transmitting through a master node vehicle that is equipped with a communications unit having a long-range interface system (e.g., 4G LTE, 5G, etc.).

The first vehicle 102, the second vehicle 104, the third vehicle 106, or other vehicles within the mesh network system 100 may each include a plurality of network interfaces configured to route communication to and from each of the vehicles. Network interfaces may be selected for communication based on a radio metric score. In embodiments, a radio metric score may be biased towards one or more sets of network interfaces based on a motion state of the first vehicle 102, the second vehicle 104, the third vehicle 106, or other vehicles within the mesh network system 100. A motion state may comprise a stationary motion state, a non-stationary motion state, a speed motion state, a range of speeds motion state, a speed based on a threshold motion state, driving patterns (e.g., stop-and-go, highway driving, etc.), proximity to other vehicles, or the like. It is noted that a motion state, such as a stationary motion state or non-stationary motion state, may include travel or vehicle information, such as whether the vehicle is moving or not moving) based on one or more factors including state of an ignition (e.g., on/off), gear (e.g., idle, driving gear), speed, traffic status and position, cruise control on/off, tracking of another vehicle, tracked vehicle status, a current position, a target or anticipated future position or destination, vehicle speeds, vehicle headings, vehicle proximities with each other, or the like. As described herein, motion states may be determined by one or more vehicle sensors, positioning data, information received from sever computing devices regarding traffic (e.g., map or traffic services), or the like.

As described herein, motion states may be determined by one or more vehicle sensors, positioning data, information received from sever computing devices regarding traffic (e.g., map or traffic services), or the like. For instance, Wi-Fi may be preferred when a vehicle is stationary and may degrade in quality when a vehicle is moving. As such, when a vehicle is stationary, the radio metric score may be biased to a first set of network interfaces (e.g., such as Wi-Fi, Bluetooth, etc.). When a vehicle is not stationary, the radio metric score may be biased to a second set of network interfaces (e.g., such as LTE, $x^{th}$ generation cellular, DSRC, V2X, C-V2X or the like, etc.).

As another example, when a vehicle is stationary or traveling below a threshold speed (e.g., below 10 miles per hour), the radio metric score may be biased to a first set of network interfaces (e.g., such as Wi-Fi, Bluetooth, etc.). When a vehicle is not stationary or traveling at or above a threshold speed, the radio metric score may be biased to a second set of network interfaces (e.g., such as LTE, $x^{th}$ generation cellular, DSRC, V2X, C-V2X or the like, etc.). It is noted that other sets of network interfaces may be utilized and/or other vehicle motion states may be utilized. For instance, embodiments may include i sets of network interfaces and j motion states (where i and j are numbers). Each motion state may be associated with a set of radio networks interfaces. Moreover, radio networks interfaces may be include in one or more sets. When a vehicle is in a motion state, the radio metric scores may be biased towards network interfaces in a set associate with the motion state.

Figure 2:
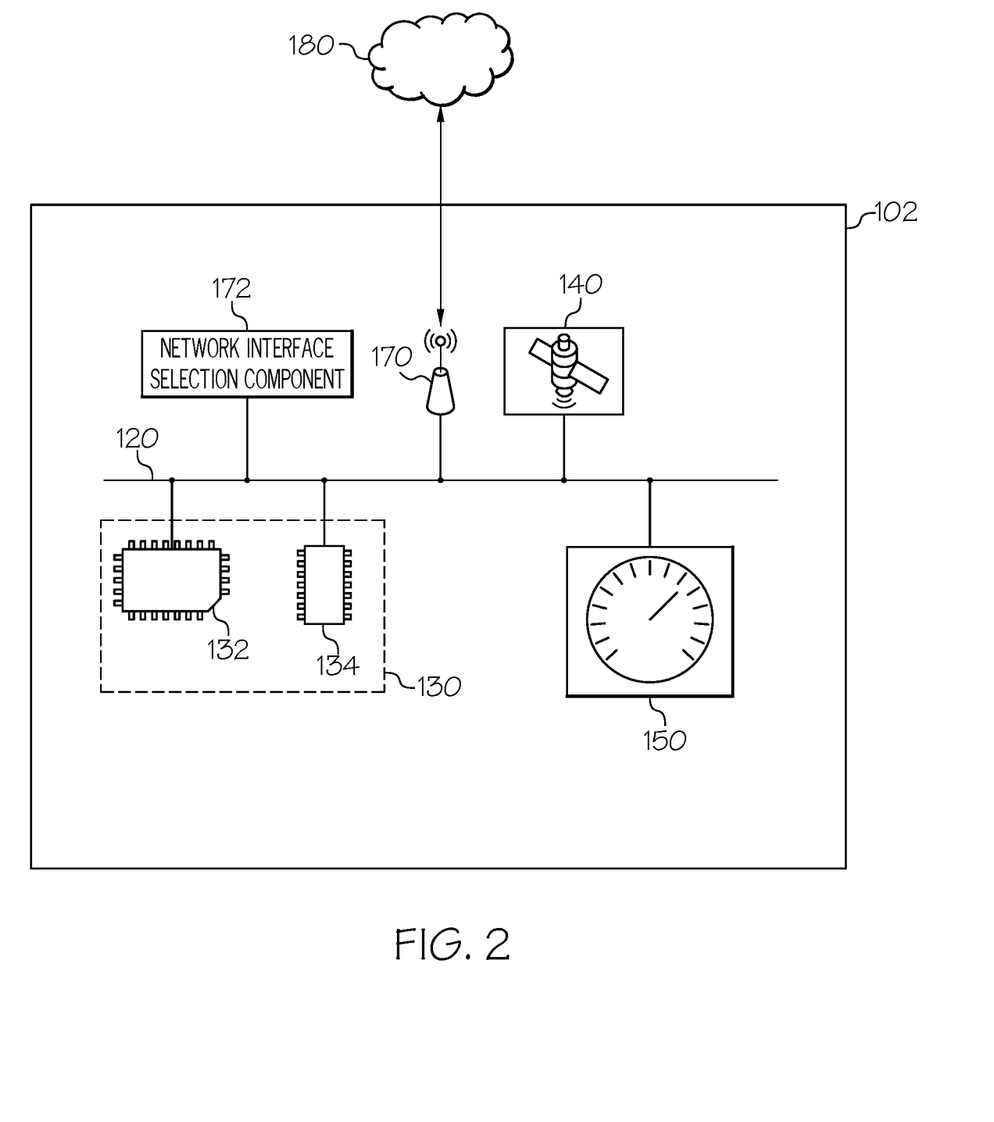
FIG. 2 schematically depicts components of a vehicle according to one or more embodiments shown and described herein.

Referring now to FIG. 2, an example schematic of a portion of the first vehicle 102 including sensor resources and a computing device is depicted. It is noted that other vehicles within the mesh network system 100 may be equipped with the same, similar, or different sets of sensor resources, telematics resources, or the like. In at least some embodiments, the first vehicle 102 may include an electronic control unit 130 comprising a processor 132 and a non-transitory computer readable memory 134, a navigation unit 140 (e.g., global positioning system (GPS), compass, etc.), a vehicle sensor(s) 150 (e.g., vehicle speed sensors, motion sensors, proximity sensors, etc.), and a communications unit 170. These and other components of the first vehicle 102 may be communicatively connected to each other via a communication bus 120.

The communication bus 120 may be formed from any medium that is capable of transmitting a signal such as, for example, conductive wires, conductive traces, optical waveguides, or the like. The communication bus 120 may also refer to the expanse in which electromagnetic radiation and their corresponding electromagnetic waves traverse. Moreover, the communication bus 120 may be formed from a combination of mediums capable of transmitting signals. In one embodiment, the communication bus 120 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. As used herein, the term "communicatively coupled" means that coupled components are capable of exchanging signals with one another such as, for example, electrical signals via conductive medium, electromagnetic signals via air, optical signals via optical waveguides, and the like.

The electronic control unit 130 may be any device or combination of components comprising a processor 132 and non-transitory computer readable memory 134. The processor 132 may be any device capable of executing the machine-readable instruction set stored in the non-transitory computer readable memory 134. Accordingly, the processor 132 may be an electric controller, an integrated circuit, a microchip, a computer, or any other computing device. The processor 132 is communicatively coupled to the other components of the first vehicle 102 by the communication bus 120. Accordingly, the communication bus 120 may communicatively couple any number of processors 132 with one another, and allow the components coupled to the communication bus 120 to operate in a distributed computing environment. Specifically, each of the components may operate as a node that may send and/or receive data. It is further noted that the processor 132 may comprise a single processor, multiple processors, or a system of processors.

The non-transitory computer readable memory 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory computer readable memory 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. It is noted that the non-transitory computer readable memory 134 may include one or more devices, memory modules, or the like.

The non-transitory computer readable memory 134 may include or be in communication with a network interface selection component 172. The network interface selection component 172 may include computer readable instructions (e.g., network interface selection component logic) that, when executed by the processor 132, cause the processor 132 to provide functions of the network interface selection component 172 described herein. The network interface selection component 172 may be configured select network interfaces having a preferred or lowest calculated radio metric connection for communicating between nodes of the mesh network system 100. For instance, the network interface selection component 172 may apply a weigh radio metric scores for Wi-Fi, LTE, 5G, DSRC, C-V2X or the like based on a motion state of a vehicle, such that plurality of network interfaces or sets of network interfaces receive greater weights depending on a determine motion state. It is further noted that the network interface selection component 172 may be disposed within or comprised by one or more devices (e.g., one or more electronic control units), remote devices (e.g., severs, remote computing devices), or the like. While embodiments may refer to a vehicle as comprising the network interface selection component 172, it is noted that severs, remote computing devices, or the like may comprise the network interface selection component 172.

In an example, a radio metric score C may be a function of a weighting factor "O", a bit size for a frame "$B_t$," a data rate "r" (e.g., Mbit/sec), and a frame error rate "ef". The weighting factor O may comprise an overhead of a network interface that may be weighted according to a motion state. As such, weighting factor O may be dynamically calculated or determined based on a motion state. In another aspect, the bit size for a frame $B_t$ may be a static value (e.g., the same for each network interface), such as 8192. Data rate r and a frame error rate ef may be dynamic (e.g., variable depending on the wireless network interface, chipset/firmware or other components of a communications units 170, environmental factors, or the like). That is, some network interface devices work better than others do depending on the node's location, distance to another node, environmental factors (e.g., weather), interference from other wireless signals, an antenna type (e.g., directional antenna, omni antenna, etc.), vehicle motion, or the like. As an example, LTE and/or DSRC will generally provide more reliable communications during movement than WiFi due to robustness to Doppler Effect, etc. For instance, the following Equation 1 may be utilized to determine weighted radio metric scores for network interfaces:

$$C = \frac{(O + B_t/r)}{(1 - ef)} \quad \text{(Equation 1)}$$

The network interface selection component 172 may calculate radio metric scores for each available network interface according to Equation 1 and may select a network interface having a desired radio metric score (e.g., best, optimal, lowest, etc.) for communications between the first vehicle 102 and other vehicles within the mesh network system 100. The network interface selection component 172 may select weighting factors O for each radio network based on a motion state, as described here and elsewhere in this disclosure. In an example, if the first vehicle 102 is determined to have a motion state that is stopped or not moving, the weighting factor O for a first network interface or set of network interfaces (e.g., Wi-Fi radio metric score for a Wi-Fi network interface), may be set to a small value with respect to values of a second network interface or a second set of network interfaces (e.g., DSRC radio metric score for a DSRC network interface, cellular radio metric score for a cellular network interface, etc.). Selecting a low weighting factor O will bias the radio metric value toward selecting the first network interface or set of network interfaces for routing. In another aspect, the network interface selection component 172 may select a higher weighting factor O for the second network interface or a second set of network interfaces, which may also bias selection to the first network interface or set of network interfaces for routing.

By way of example, when in a stationary motion state, the weighting factor O for a first network interface (e.g., Wi-Fi) may be about between 1,000 and 700, or the like. In one embodiment, the weighting factor O may be 800. When in a moving, non-stationary motion state, or traveling at a speed above at or above a threshold, the weighting factor O may be between 1,000 and 3,000, such as about 2,000. The weighting factor O for other networks, such as DSRC, LTE, or the like may be between 1,000 and 700, such as about 800 when in stationary motion state, a non-stationary motion state, or other motion state. It is noted that the weighting factor O may comprise other values for network interfaces, may be weighted based on other motion states, or the like.

In at least some embodiments, the network interface selection component 172 may iterate calculating of radio metric scores and selection of a desired network interface in response to a triggering event, while applying an adjusted weight for the network interfaces based on changes to a motion state. For instance, a triggering event may include passage of time (e.g., intervals, periodically, etc.), change in vehicle motion state (e.g., starting, stopping, change in speed, etc.), removal or addition of a node, change to an environmental factor, or the like. It is further noted that the network interface selection component 172 may alter interval length based on vehicle motion, environmental factors, removal or addition of a node, or the like. For example, if a vehicle sensor(s) 150 (as described in more detail herein) determines that the first vehicle 102 is in a station state then begins to move at a determined speed or acceleration, the network interface selection component 172 may iterate calculation of radio metric scores and selection of a network interface. It is noted that the iterations may apply different weights for network interfaces.

In an example, the network interface selection component 172 may iterate calculation of radio metric scores and selection of a network interface at expiration of a time interval. For instance, the network interface selection component 172 may calculate radio metric scores and select a network interface every t units of time (e.g., 30 seconds, five minutes, etc.). In some embodiments, different intervals may be selected based on a motion state of a vehicle. For instance, the network interface selection component 172 may utilize a stationary time interval which may be an extended time interval (e.g., such as 5 minutes, 30 minutes, 1 hour, etc.) when compared to a time interval when the first vehicle 102 is moving and/or moving at a speed meeting or exceeding a threshold speed. In another example, if the first vehicle 102 is moving and/or moving at a speed meeting or exceeding a threshold speed, then the network interface selection component 172 may apply a non-stationary time interval that is a relatively shorter interval (e.g., 10 seconds, 20 seconds, 1 minute, etc.). In another example, if vehicles within the mesh network system 100 are moving at a relatively constant configuration (e.g., remaining within a determined distance from one and another, moving at similar speeds, etc.), then the network interface selection component 172 may utilize a time interval that is greater than when vehicles are moving rapidly and/or in a non-constant configuration. It is noted that the network interface selection component 172 may select time intervals and/or calculate time intervals based on environmental factors, motion states, interference, or the like. Moreover, network interface selection component 172 may apply a weighted algorithm to determine time intervals. It is noted that other intervals and threshold may be utilized. Moreover, the network interface selection component 172 may adjust intervals based on the proximity or distance between the vehicles within the mesh network system 100 changes, in response to a transmission exceeding a threshold amount of time (e.g., timing out), or the like.

Accordingly, the network interface selection component 172 may select a time interval for calculating radio metric scores for each of a plurality of network interfaces for the vehicles, wherein the time interval is based at least in part on a motion state of a vehicle. The network interface selection component 172 may iterate, at least at the time interval, the following calculating the radio metric scores for each of the plurality network interfaces for a first vehicle of the plurality of vehicles, selecting a desired network interface from the plurality of network interfaces based on the radio metric scores, instructing the communications unit 170 to transmit a request packet from the first vehicle 102 to the second vehicle 104 or the third vehicle 106, and receiving, via the communications unit 170, a final route and network interface type for communications. It is further noted that each electronic control unit 130B, 130C (See FIG. 3) may receive the request packets and iterate calculating radio metric scores, and sending the request packet to other relay nodes or a destination node.

In embodiments, network interface selection component 172 may utilize artificial intelligence, statistical models, or other processes and/or algorithms to determine time intervals, weights for motion states, adjust motion state classifications (e.g., determine patterns, adjust speed thresholds, etc.). For instance, motion states may be mapped to a radio metric vector and to a confidence that the motion state and the radio metric vector belongs to a class. An input attribute vector, x=(x1, x2, x3, x4, xn) may be mapped to f(x) =confidence(class). Such classification can employ a probabilistic and/or statistical based analysis (e.g., factoring into the analysis environmental factors, motion states of the first vehicle 102 or other vehicles, or the like) to infer an action or network interface to be selected. In various embodiments, systems and methods may utilize other directed and undirected model classification approaches include, e.g., naïve Bayes, Bayesian networks, decision trees, neural networks, fuzzy logic models, and probabilistic classification models providing different patterns of independence. Classification may also include statistical regression that is utilized to develop models of priority for selection of network interfaces.

According to an embodiment, network interface selection component 172 may determine communication paths (e.g., node orders, etc.) and/or network interfaces for communications between nodes. A node such as the first vehicle 102, may send a radio metric exchange with each connected to the sending node (e.g., source node, requesting node, etc.). The radio metric, such as airtime, quantifies the quality of a network interface connection. The first vehicle 102 may then send a request packet to each node within the mesh network system 100 via communications unit 170. Each relay node or relay electronic control unit (e.g., second vehicle 104, third vehicle 106, electronic control unit 130B, electronic control unit 130C, etc.) may add, via their own network interface selection component 172, the value of the radio metric for the upcoming wireless link to the existing value of the radio metric in the request packet such that an accumulated radio metric value may be determined. In examples, each relay node may select a network interface of available network interfaces of the communications unit 170 having a lowest radio metric value, such as lowest airtime. The relay node may then transmit, via the communications unit 170, the request packet to the next relay node. This may iterate until a destination node receives the request packet. The destination node may then determine, via its own network interface selection component 172, a route and network interface type for communications. The destination node may then transmit a response packet that may notify each relay node of the selected route and selected network interface. As identified herein, the network interface selection component 172 may thus select a network interface between nodes with the lowest radio metric value for communications between nodes.

In some embodiments, the network interface selection component 172 may be configured to selectively utilize environmental factors for selection of a network interface. It is noted that utilization of environmental factors may be determined based on a user setting (e.g., user selection of whether to utilize environmental factors), may be configured to be utilized, or may be configured not to be utilized. For instance, as the mesh network system 100 involves moving nodes (e.g., first vehicle 102, second vehicle 104, and third vehicle 106) that change in environmental factors, such as distance, location, and signal stability/strength between each other, may alter the radio metric for each type of network interface device (e.g., Wi-Fi, LTE, 5G, C-V2X) between each node.

Still referring to FIG. 2, a navigation unit 140 such as a GPS device, electronic compass, or the like may be coupled to the communication bus 120 and communicatively coupled to the electronic control unit 130 of the first vehicle 102. The navigation unit 140 is capable of generating location information and/or heading information indicative of a location of the first vehicle 102 by receiving one or more GPS signals from one or more GPS satellites. The navigation unit 140 may be configured to generate heading information, for example, based on an electronic compass. The GPS signal communicated to the electronic control unit 130 via the communication bus 120 may include location information comprising a National Marine Electronics Association (NMEA) message, a latitude and longitude data set, a street address, a name of a known location based on a location database, or the like. Additionally, the navigation unit 140 may be interchangeable with any other systems capable of generating an output indicative of a location. For example, a local positioning system that provides a location based on cellular signals and broadcast towers or a wireless signal detection device capable of triangulating a location by way of wireless signals received from one or more wireless signal antennas.

The first vehicle 102 may also include a vehicle sensor(s) 150 coupled to the communication bus 120 and communicatively coupled to the electronic control unit 130. The vehicle sensor(s) 150 may be any sensor or system of sensors for generating a signal indicative of vehicle speed, movement, proximity to other vehicles, etc. For example, without limitation, a vehicle sensor(s) 150 may be a tachometer that is capable of generating a signal indicative of a rotation speed of a shaft of the first vehicle 102 engine or a drive shaft. Signals generated by the vehicle sensor(s) 150 may be communicated to the electronic control unit 130 and converted to a vehicle speed value. The vehicle speed value is indicative of the speed of the first vehicle 102. In some embodiments, the vehicle sensor(s) 150 comprises an opto-isolator slotted disk sensor, a Hall Effect sensor, a Doppler radar, or the like. In some embodiments, a vehicle sensor(s) 150 may comprise data from a GPS for determining the speed of the first vehicle 102. The vehicle sensor(s) 150 may be provided so that the electronic control unit 130 may determine when the first vehicle 102 accelerates, maintains a constant speed, slows down or comes to a stop. For example, a vehicle sensor(s) 150 may provide signals to the electronic control unit 130 indicative of a vehicle 102 slowing down due to a change in traffic conditions or prior to the vehicle performing a turning maneuver. It is further noted that the vehicle sensor(s) 150 may determine a state of a vehicle, such as a motion state of a vehicle (e.g., whether the vehicle is moving or not moving) based on one or more factors including state of an ignition (e.g., on/off), gear (e.g., idle, driving gear), speed, traffic status and position, cruise control on/off, tracking of another vehicle, tracked vehicle status, or the like.

The electronic control unit 130 may determine travel parameters such as a speed, direction of travel or heading, position, future or projected position, final destination, proximity or distance between vehicles (e.g., 1 mile, ¾ mile, ½ mile, ¼ mile, 5000 ft., 4000 ft., 3000 ft., 2000 ft., 1500 ft., 1000 ft., 500 ft., or 250 ft.), or the like based on one or more signals received from vehicle sensor(s) 150 and/or navigation unit 140. In some embodiments, the electronic control unit 130 selects vehicles to be included in the mesh network based on the travel parameters derived or received from the one or more signals from the vehicle sensor(s) 150 and/or navigation unit 140. For instance, the electronic control unit 103 (e.g., via the network interface selection component 172) and/or the computing device 192 (See FIG. 3) (via an electronic control unit or abstraction layer) identifies vehicles for and/or generates a mesh network including one or more vehicles based on: (i) a comparison of the speed of the vehicles and (ii) a comparison of the heading of the vehicles. As one example, the computing device 192 and/or the electronic control unit 130 identify one or more vehicles of the plurality of vehicles that are traveling at a speed that is less than or equal to a predetermined speed threshold of each other and have a heading that is less than or equal to a predetermined heading threshold of each other. The predetermined speed threshold may be about +/−10 miles per hour, about +/−9 miles per hour, about +/−8 miles per hour, about +/−7 miles per hour, about +/−6 miles per hour, about +/−5 miles per hour, about +/−4 miles per hour, about +/−3 miles per hour, about +/−2 miles per hour, about +/−1 miles per hour, or about +/−0.5 miles per hour. The predetermined heading threshold may be +/−10 degrees, +/−9 degrees, +/−8 degrees, +/−7 degrees, +/−6 degrees, +/−5 degrees, +/−4 degrees, +/−3 degrees, +/−2 degrees, +/−1 degrees, +/−0.5 degrees, or +/−0.25 degrees.

Still referring to FIG. 2, communications unit 170 may include a vehicle-to-vehicle communication device for communicating with other vehicles (e.g., the second vehicle 104, the third vehicle 106, etc.). The communications unit 170 may be coupled to the communication bus 120 and communicatively coupled to the electronic control unit 130. The communications unit 170 may be any device capable of transmitting and/or receiving data with a network 180 or directly with another vehicle (e.g., the second vehicle 104, the third vehicle) equipped with a communications unit 170. Accordingly, communications unit 170 can include a communication transceiver for sending and/or receiving any wired or wireless communication according to a network interface or protocol. For example, the communications unit 170 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, a communications unit 170 may include hardware configured to operate in accordance with the Bluetooth wireless communication protocol. In another embodiment, a communications unit 170 may include a Bluetooth send/receive module for sending and receiving Bluetooth communications to/from a network 180 and/or another vehicle.

Figure 3:
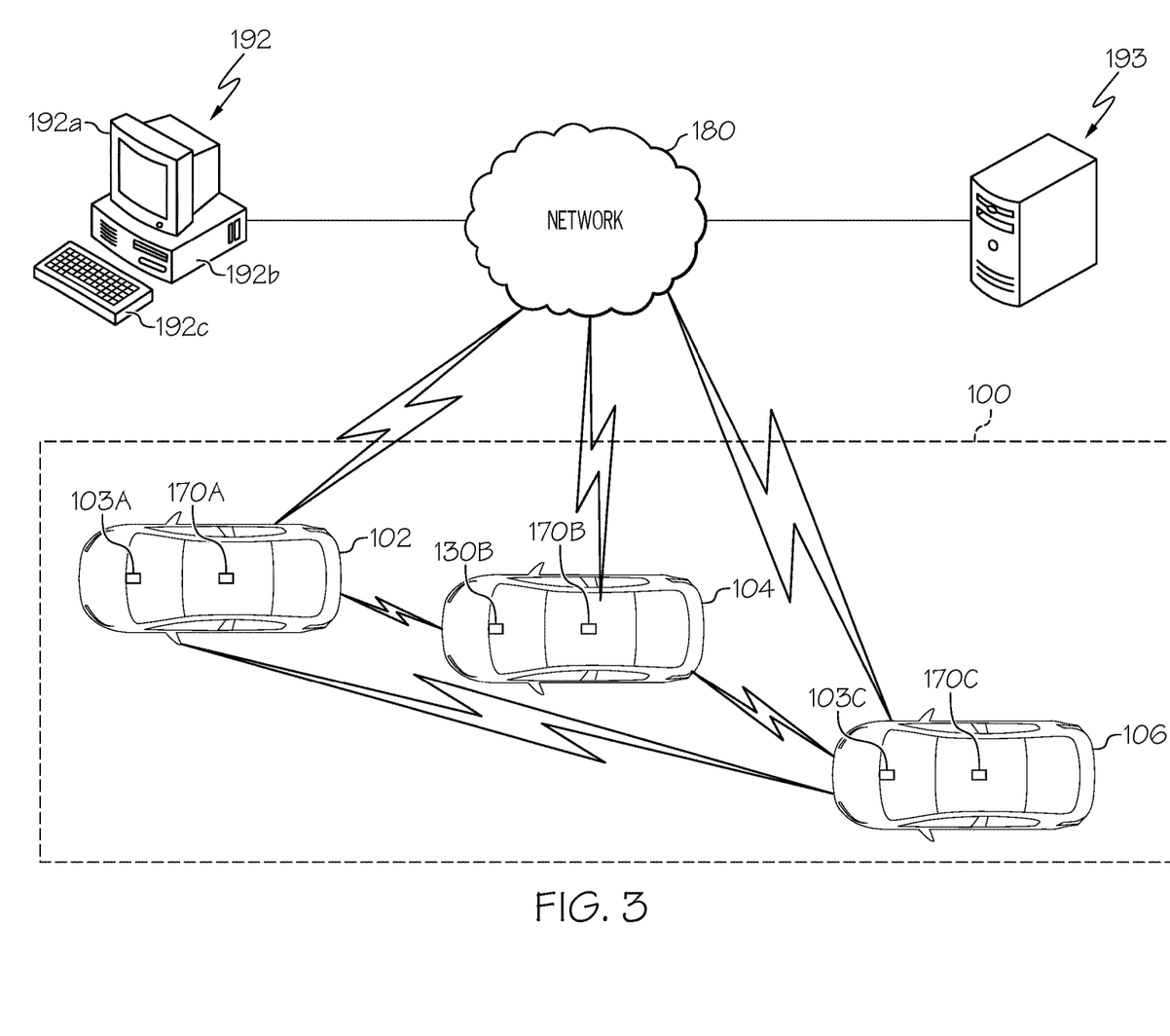
FIG. 3 depicts an illustrative embodiment of a system for selecting a desired network interface for a mesh network system according to one or more embodiments shown and described herein.

Referring now to FIG. 3 with reference to FIGS. 1 and 2, an illustrative embodiment of a system 300 for communicating with vehicles within the mesh network system 100. In some embodiments, communication between the first vehicle 102, the second vehicle 104, and the third vehicle 106 may be direct between each other. That is, the first vehicle 102 may communicate directly with the second vehicle 104 and/or the third vehicle 106, the second vehicle 104 may communicate directly with the first vehicle 102 and/or the third vehicle 106, and the third vehicle 106 may communicate directly with the first vehicle 102 and/or the second vehicle 104. In some embodiments, the first vehicle 102, the second vehicle 104 and/or the third vehicle 106 may communicate with each other through a network 180. In yet some embodiments, the first vehicle 102, the second vehicle 104 and/or the third vehicle 106 may communicate with one or more computing devices 192 and/or servers 193.

The network 180 may include one or more computer networks (e.g., a personal area network, a local area network, or a wide area network), cellular networks, satellite networks and/or a global positioning system and combinations thereof. Accordingly, the first vehicle 102, second vehicle 104 and third vehicle 106 and the computing device 192 and/or server 193 may be communicatively coupled to each other through the network 180 via wires or wireless technologies, via a wide area network, via a local area network, via a personal area network, via a cellular network, via a satellite network, or the like. Suitable local area networks may include wired Ethernet and/or wireless technologies such as, for example, Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, C-V2X, and GSM.

In particular, FIG. 3 depicts a first vehicle 102 having an electronic control unit 130A and a communications unit 170A, a second vehicle 104 having an electronic control unit 130B and a communications unit 170B, and a third vehicle having an electronic control unit 130C and a communications unit 170C. As descried in more detail herein, each of the vehicles, for example, the first vehicle 102, the second vehicle 104, and the third vehicle 106, when in range of each other, may share their speed, heading, position, destination information or the like with each other or the computing device 192.

The computing device 192 may include a display 192a, a processing unit 192b and an input device 192c, each of which may be communicatively coupled together. The processing unit 192b may include a processor, input/output hardware, network interface hardware, a data storage, and a memory component. The server 193 may have a similar configuration as the computing device 192, but configured to operate more strictly as a data storage and application support device.

The processor may include any processing component(s) configured to receive and execute instructions (such as from the data storage component and/or memory component). The instructions may be in the form of a machine-readable instruction set stored in the data storage component and/or the memory component. The input/output hardware may include a monitor, keyboard, mouse, printer, camera, microphone, speaker, and/or other device for receiving, sending, and/or presenting data. The network interface hardware may include any wired or wireless networking hardware, such as a modem, LAN port, Wi-Fi card, WiMax card, mobile communications hardware, and/or other hardware for communicating with other networks and/or devices.

It should be understood that the data storage component may reside local to and/or remote from the computing device 192 and may be configured to store one or more pieces of data such as a routing table, updates for vehicle systems, or the like for access by the computing device 192 and/or other components. It is understood that the server 193 may also be configured to store one or more pieces of data such as a routing table, updates for vehicle systems, or the like for access by the computing device 192 and/or vehicles via the network 180. It is noted that the computing device 192 and/or the serve server 193 may comprise electronic control devices.

A computing device 192 and/or an electronic control unit 130 may then use the speed, heading, position, and/or destination information, also referred to herein as traveling parameters, to determine relationships between the vehicles and identify vehicles that may form a mesh network based on their traveling parameters. Once a mesh network is established by the computing device 192 or the electronic control unit 130, a master node vehicle (e.g., first vehicle 102) may be identified and utilized as an access point for other vehicles (e.g., second vehicle 104) in the mesh network system 100 to communicate with the computing device 192, the server 193, or other devices via the WAN (e.g., the network 180).

As described herein, the mesh network system 100 may include the first vehicle 102, the second vehicle 104, the third vehicle 106, and/or other vehicles, where each vehicle acts as a node. Moreover, each communications unit 170A, 170B, 170C of the respective vehicles may include network interfaces for a plurality of different networks, protocols, or the like. For instance, each communications unit 170A, 170B, 170C may include one or more antennas (e.g., many in/many out (MIMO) antennas, etc.) that may allow for communication via Wi-Fi networks, IrDA, Bluetooth, Wireless USB, Z-Wave, ZigBee, near field communication (NFC), LTE, WiMAX, UMTS, CDMA, C-V2X, GSM interfaces may include Wi-Fi, $x^{th}$ generation cellular technology (e.g., 2G, 3G, 4G, 5G, etc.), WCDMA, LTE Advanced, or the like. The electronic control units 130A, 130B, 130C and/or the computing device 192 or the servers 193 may be configured to calculate radio metrics for communications between the vehicles or the communications unit 170A, 170B, 170C over the plurality of network interfaces. In examples, a network interface selection component 172 may transmit a request packet to each node within the mesh network system 100 via communications unit 170, where the request packet includes an airtime radio metric. Each receiving vehicle or relay node (e.g., second vehicle 104, third vehicle 106, etc.) may add, via their own network interface selection component 172, an airtime radio metric for the upcoming wireless link to the existing value of the airtime radio metric in the request packet such that an accumulated radio metric value may be determined. In examples, each network interface selection component 172 may select a network interface having a lowest airtime radio metric. The nodes/vehicles within the mesh network system 100 may iterate receiving a request and calculating a radio metric until a destination or terminal node receives the request. The destination node may then calculate a final route and network interface type for communications between each node. The destination node may then transmit a response packet that may notify each relay node of the selected route and selected network interface. As identified herein, the network interface selection component 172 may thus select a network interface between nodes with the lowest radio metric value for communications between nodes, without biasing towards any one network interface. It is noted that a network interfaces may or may not be an ideal network interface for communications between two different nodes. For instance, communications between the first vehicle 102 and the second vehicle 104 may utilize a first radio metric which has a first airtime radio metric score, while communications between the first vehicle 102 and the third vehicle 106 may utilize a second radio metric which has a second airtime radio metric score.

In particular, FIG. 3 depicts a first vehicle 102 having an electronic control unit 130A and a communications unit 170A, a second vehicle 104 having an electronic control unit 130B and a communications unit 170B, and a third vehicle having an electronic control unit 130C and a communications unit 170C. In embodiments described herein, an electronic control unit may act as an initiating electronic control unit (e.g., initiating node) which transmits an initial request, a relay electronic control unit (e.g., relay node) which receives a request and transmits to another relay node or a destination node, or a destination electronic control unit (e.g., destination node) which is a target for a request. As descried in more detail herein, each of the vehicles, for example, the first vehicle 102, the second vehicle 104, and the third vehicle 106, when in range of each other, may share their speed, heading, position, destination information or the like with each other or the computing device 192.

The computing device 192 may include a display 192a, a processing unit 192b and an input device 192c, each of which may be communicatively coupled together. The processing unit 192b may include a processor, input/output hardware, network interface hardware, a data storage, and a memory.

Figure 4:
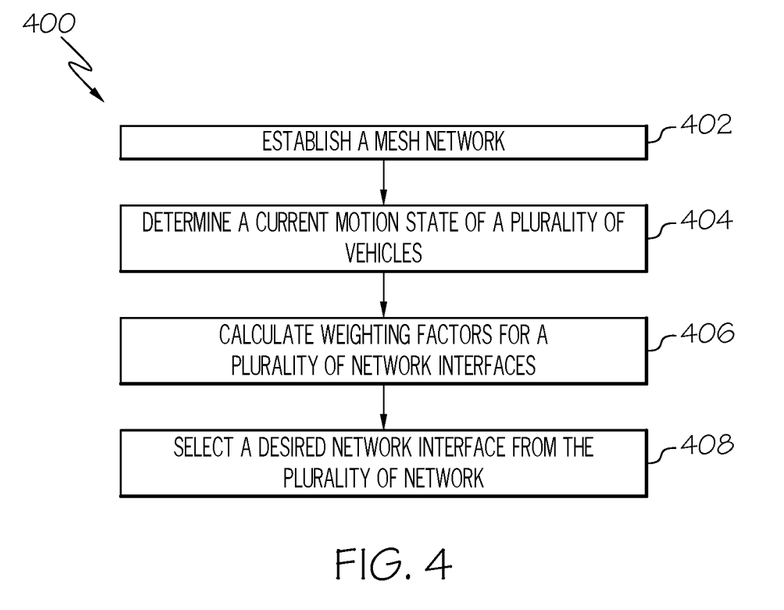
FIG. 4 depicts a flowchart of an example method for selecting a desired network interface for a mesh network system according to one or more embodiments shown and described herein.

In view of the subject matter described herein, methods that may be related to various embodiments may be better appreciated with reference to the flowchart of FIG. 4. While the method is shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by a mesh network system or components thereof, such as the computing device 192 and/or an electronic control unit 130 (e.g., FIGS. 2-3), or the like.

FIG. 4 depicts a flowchart 400 of an example method for selecting a desired network interface for a mesh network system. The flowchart 400 depicted in FIG. 4 is a representation of a machine-readable instruction set stored in the non-transitory computer readable memory 134 and executed by the processor 132 of an electronic control unit 130 or a processing unit 192b of a computing device 192. The process of the flowchart 400 in FIG. 4 may be executed at various times and intermittently repeated (e.g., every minute, five minutes, etc.) to confirm membership of vehicles to a mesh network.

At block 402, the method may establish a mesh network. For instance, a mesh network system (See FIGS. 1-3) (e.g., via a computing device 192 and/or an electronic control unit 130), may establish a mesh network between plurality of vehicles. Each vehicle of the plurality of vehicles includes a communications unit comprising a plurality of network interfaces. The mesh network system may identify vehicles to be included in the mesh network based on vehicle travel characteristics, such as position information (e.g., a current position of vehicles, a target or anticipated future position or destination of vehicles, vehicle speeds, vehicle headings, vehicle proximity, or the like. In examples, the mesh network system may receive data from the plurality of vehicles based on vehicle sensors. According to some embodiments, the mesh network system may receive travel characteristics from remote computing devices, GPS systems, or the like. In some embodiments, the mesh network identifies and/or generates a mesh network including one or more vehicles based on: (i) a comparison of the current positions of the vehicles and (ii) a comparison of the future positions of the vehicles. For instance, vehicles with similar current positions and similar future positions may be selected for a mesh network. Similar current positions and similar future positions may be vehicles within a predetermined range of each other and/or have a similar heading and speed, or the like.

At block 404, the method may determine a current motion state of a plurality of vehicles. In embodiments, the mesh network system may determine a current motion state of the plurality of vehicles. The current motion state of the plurality of vehicles may be determined or calculated based on vehicle travel characteristics, such as position information, or the like. In at least some embodiments, the mesh network system may determine the current motion state based on a vehicle sensor signal received from a vehicle sensor (e.g., vehicle sensor(s) 150, FIG. 2-3). The vehicle sensor may be configured to generate a sensor signal that is indicative of a vehicle speed, a vehicle movement, a vehicle proximity to other vehicles, or a combination thereof. The current motion state may be selected from a plurality of predefined motion states, such as at least one of a stationary motion state, a non-stationary motion state, a range of speed based motion state, driving pattern motion state, or a proximity to other vehicles motion state. According to at least some embodiments, motion states may be identified for a set of vehicles having similar motion states. In another aspect, motion states may be determined based on artificial intelligence, statistical models, or other processes and/or algorithms to determine or adjust motion state classifications (e.g., determine patterns, adjust speed thresholds, etc.).

At block 406, the method may calculate weighting factors for a plurality of network interfaces. In examples, the mesh network system may calculate weighting factors (e.g., weighting factor "C" for each of the plurality of network interfaces based at least in part on the current motion state). In at least some embodiments, the weighting factor "C" for network interfaces may be predetermined based on a current motion state. For instance, if the current motion state is a stationary motion state, a "stop-and-go" motion state, or a low speed motion state, the weighting factor O for a first network interface (e.g., Wi-Fi network interface) may be about biased or adjusted such that Wi-Fi is more heavily weighted such that a radio metric score for the Wi-Fi network interface will more likely have a desired or preferred score in comparison to radio metric scores of other network interfaces. In an example, the weighting factor O for Wi-Fi in a stationary motion state may be between 1,000 and 700, or the like. In one embodiment, the weighting factor O may be 800. When in a moving, non-stationary motion state, or traveling at a speed above at or above a threshold, the weighting factor O for a Wi-Fi network interface may be biased away from the Wi-Fi network interface. In an example, the weighting factor O may be between 1,000 and 3,000, such as about 2,000. The weighting factor O for other networks, such as DSRC, LTE, or the like may be between 1,000 and 700, such as about 800 when in stationary motion state, a non-stationary motion state, or other motion state. It is noted that the weighting factor O may comprise other values for network interfaces, may be weighted based on other motion states, or the like. It is noted that the weighting factor O may comprise other values depending on the weighted algorithm or function utilized to bias selection of network interfaces.

At block 408, the method may select a desired network interface from the plurality of network interfaces. According to embodiments, the mesh network system may calculate radio metric scores for each of the plurality of network interfaces as a function of at least the weighting factors for each of the plurality of network interfaces. In at least some embodiments, the radio metric score C may be a function of a weighting factor "O", a bit size for a frame "$B_t$," a data rate "r" (e.g., Mbit/sec), and a frame error rate "ef". For instance, Equation 1, as described herein, may be utilized to determine weighted radio metric scores for network interfaces:

$$C = \frac{(O + B_t/r)}{(1-ef)}. \quad \text{(Equation 1)}$$

The mesh network system may select a desired network interface from the plurality of network interfaces for communications between the plurality of vehicles based on the radio metric scores. Selection of the desired network interface may comprise selecting a network interface comprising a radio metric score that indicates that the desired network interface has improved or preferred characteristics over other network interfaces, such as greater reliability, improved latency, or the like. Depending on the weighting algorithm utilized, the radio metric score may be the lowest, highest, or other radio matric score. It is noted that the mesh network system may iterate calculating the weighting factors, calculating the radio metric scores, and selecting the desired network interface in response to a triggering event. The triggering event may comprise at least one of a change in an environmental factor, a passage of a time interval, or a change to the plurality of vehicles.

The functional blocks and/or flowchart elements described herein may be translated onto machine-readable instructions. As non-limiting examples, the machine-readable instructions may be written using any programming protocol, such as: descriptive text to be parsed (e.g., such as hypertext markup language, extensible markup language, etc.), (ii) assembly language, (iii) object code generated from source code by a compiler, (iv) source code written using syntax from any suitable programming language for execution by an interpreter, (v) source code for compilation and execution by a just-in-time compiler, etc. Alternatively, the machine-readable instructions may be written in a hardware description language (HDL), such as logic implemented via either a field programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Accordingly, embodiments describe a mesh network system. The mesh network system includes an electronic control unit and/or computing device configured to select a network interface for communications within a mesh network. More particularly, the electronic control unit may determine a current motion state of a plurality of vehicles of a mesh network. The electronic control unit may calculate radio metric scores for each of a plurality of network interfaces. The radio metric scores are weighted based on the current motion state such that a first radio metric score of a first network interface is more heavily weighted when in the current motion state. For instance, in a stationary motion state, a Wi-Fi network interface radio metric score may be more heavily weighted. In embodiments, the electronic control unit selects a desired network interface from the plurality of network interfaces for communications between the plurality of vehicles based on the radio metric scores.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A mesh network system, comprising:
   an electronic control unit configured to:
   wirelessly communicate with a plurality of vehicles via a mesh network;
   determine a current motion state of a vehicle of the plurality of vehicles communicating via the mesh network;
   calculate a plurality of radio metric scores, respectively, for a plurality of network interfaces of the vehicle, wherein each radio metric score "C" of the plurality of radio metric scores is calculated as a function of a weighting factor "O", a bit size for a frame "$B_t$", a data rate "r", and a frame error rate "ef", wherein the plurality of radio metric scores are weighted based on the current motion state such that a first radio metric score of a first network interface of the vehicle is more heavily weighted when in the current motion state; and
   select a desired network interface from the plurality of network interfaces for the vehicle to wirelessly communicate via the mesh network based on the plurality of radio metric scores.

2. The mesh network system of claim 1, wherein the current motion state is a stationary motion state, and wherein the first network interface is a Wi-Fi network interface.

3. The mesh network system of claim 2, wherein the electronic control unit is further configured to:
   iterate determining the current motion state of the vehicle;
   in response to the current motion state altering from the stationary motion state, calculate a plurality of adjusted weights for the plurality of network interfaces such that the Wi-Fi network interface is less heavily weighted; and
   calculate the plurality of radio metric scores for the plurality of network interfaces based at least in part on the plurality of adjusted weights for the plurality of network interfaces.

4. The mesh network system of claim 1, wherein the function comprises:

$$C = \frac{(O + B_t/r)}{(1 - ef)}.$$

5. The mesh network system of claim 1, wherein the electronic control unit selects the weighting factor O for each of the plurality of network interfaces based on the current motion state.

6. The mesh network system of claim 5, wherein in response to the current motion state comprising a stationary motion state, the electronic control unit selects the weighting factor O for a Wi-Fi network interface to be a smaller value than the weighting factor O for the Wi-Fi network interface when the current motion state is not the stationary motion state.

7. The mesh network system of claim 1, further comprising a vehicle sensor communicatively coupled to the electronic control unit, wherein the vehicle sensor is configured to identify the current motion state.

8. The mesh network system of claim 7, wherein the vehicle sensor comprises at least one of a speed sensor, a motion sensors, or a proximity sensor.

9. The mesh network system of claim 7, wherein the current motion state is selected from at least one of a stationary motion state, a non-stationary motion state, a range of speed based motion state, or driving pattern motion state.

10. The mesh network system of claim 1, wherein the current motion state is a non-stationary motion state, and wherein the first network interface is at least one of a cellular network interface or a dedicated short-range communication network interface.

11. The mesh network system of claim 1, wherein the electronic control unit is further configured to:
    iterate determining the current motion state of the vehicle; and
    in response to the current motion state altering, alter a weight applied to calculate the plurality of radio metric scores for the plurality of network interfaces.

12. A mesh network system, comprising:
    a computing device operatively in communication with a plurality of vehicles of a mesh network,
    the computing device configured to:
    determine a current motion state of a vehicle of the plurality of vehicles;
    calculate a plurality of radio metric scores, respectively, for a plurality of network interfaces of the vehicle, wherein each radio metric score "C" of the plurality of radio metric scores is calculated as a function of a weighting factor "O", a bit size for a frame "$B_t$", a data rate "r", and a frame error rate "ef";
    and
    select a desired network interface from the plurality of network interfaces for the vehicle to wirelessly communicate via the mesh network based on the plurality of radio metric scores.

13. The mesh network system of claim 12, wherein the plurality of network interfaces include a Wi-Fi network interface and at a dedicated short-range communication network interface.

14. The mesh network system of claim 13, wherein
    in response to the current motion state comprising a stationary motion state, the computing device is further configured to calculate a Wi-Fi weighting factor to bias the computing device to select the Wi-Fi network interface as the desired network interface; and in response to the current motion state comprising a non-stationary motion state, the computing device is further configured to calculate the Wi-Fi weighting factor to bias the computing device to select the dedicated short-range communication network interface as the desired network interface.

15. The mesh network system of claim 12, wherein the function comprises:

$$C = \frac{(O + B_t/r)}{(1 - ef)}.$$

16. A method comprising:

determining, by a computing device, a current motion state of a vehicle of a plurality of vehicles wirelessly communicating via a mesh network;

calculating a plurality of radio metric scores, respectively, for a plurality of network interfaces of the vehicle, wherein each radio metric score "C" of the plurality of radio metric scores is calculated as a function of a weighting factor "O", a bit size for a frame "$B_t$", a data rate "r", and a frame error rate "ef"; and selecting a desired network interface from the plurality of network interfaces for the vehicle to wirelessly communicate via the mesh network based on the plurality of radio metric scores.

17. The method of claim 16, further comprising, iterating calculating the plurality of radio metric scores, and selecting the desired network interface in response to a triggering event.

18. The method of claim 17, wherein the triggering event comprises at least one of a change in an environmental factor, a passage of a time interval, or a change to the plurality of vehicles.

19. The method of claim 18, further comprising selecting the time interval based on a motion state of the vehicle.

* * * * *

UNITED STATES PATENT AND TRADEMARK OFFICE
CERTIFICATE OF CORRECTION

| | |
|---|---|
| PATENT NO. | : 11,825,527 B2 |
| APPLICATION NO. | : 17/219005 |
| DATED | : November 21, 2023 |
| INVENTOR(S) | : Shingo Sugimoto and Walter Accessor |

It is certified that error appears in the above-identified patent and that said Letters Patent is hereby corrected as shown below:

In the Specification

In Column 5, Line(s) 33, delete "include" and insert --included-- therefor.

In Column 5, Line(s) 35, delete "associate" and insert --associated-- therefor.

Signed and Sealed this
Ninth Day of July, 2024

Katherine Kelly Vidal
*Director of the United States Patent and Trademark Office*